United States Patent Office 2,802,888
Patented Aug. 13, 1957

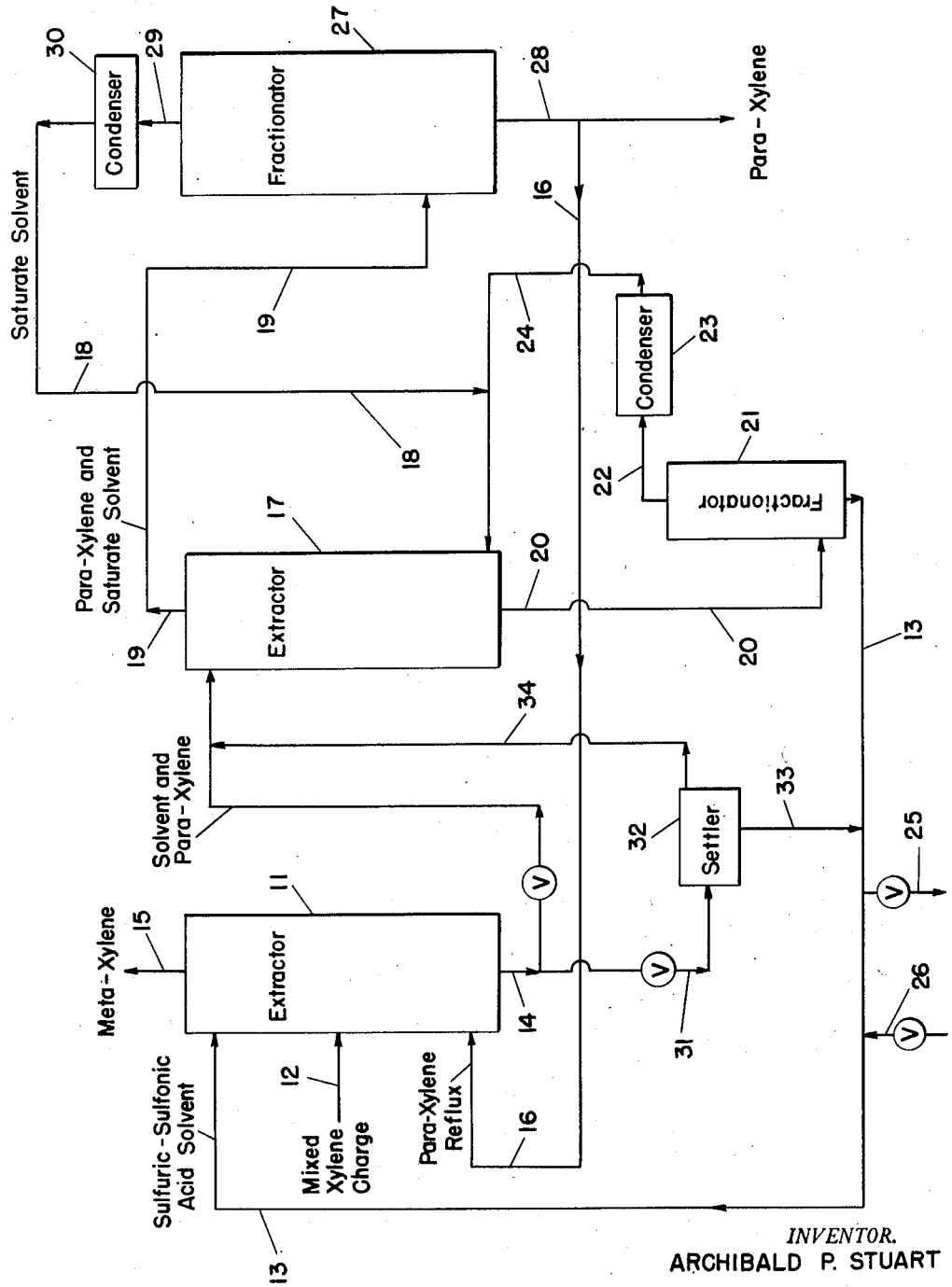

2,802,888

SEPARATION OF XYLENES BY EXTRACTION WITH AN AQUEOUS SULFURIC ACID-AROMATIC SULFONIC ACID SOLVENT

Archibald P. Stuart, Media, Pa., assignor to Sun Oil Company, Philadelphia, Pa., a corporation of New Jersey Application December 31, 1953, Serial No. 401,527

6 Claims. (Cl. 260—674)

The present invention relates to the separation of xylenes, and pertains more particularly to the separation of meta- and para-xylenes from mixtures thereof by solvent extraction.

Commercial xylene mixtures generally contain all three xylene isomers, ortho-, meta-, and para-xylene, together with ethylbenzene and saturate hydrocarbon impurities. Ortho-xylene may be separated from such mixtures by fractional distillation, but the separation of meta- and para-xylenes by distillation is impractical due to the closeness of their boiling points.

It is therefore an object of this invention to provide a new process for the separation of meta- and para-xylenes which process comprises a relatively few simple operating steps. Other objects will be apparent hereinafter.

The accompanying drawing illustrates in simple diagrammatic form the process steps of one embodiment of the present invention.

In accordance with the present invention mixtures of xylenes comprising meta- and para-xylenes are separated by selectively extracting the para-xylene with a solvent comprising sulfuric acid and aromatic sulfonic acid under substantially non-sulfonating conditions. I have made the surprising discovery that liquid mixtures of sulfuric acid and aromatic sulfonic acid comprising by weight more $H_2SO_4$ than aromatic sulfonic acid preferentially dissolve para-xylene from mixtures of meta- and para-xylenes. As typical results for a single stage batch extraction, 24% para-xylene may be concentrated to 41% and 46% para-xylene concentrated to 82%, by extraction with said selective solvent. By employing a plurality of extraction stages and varying the ratio of solvent to xylenes, relatively pure meta- and para-xylene product fractions can be obtained. The solvent extract is readily separated to recover separately the selective solvent and the para-xylene product.

In one aspect the present invention comprises intimately contacting a mixture of meta- and para-xylenes with the selective solvent comprising by weight more $H_2SO_4$ than aromatic sulfonic acid, whereby the para-xylene is selectively absorbed by the solvent, separating the unabsorbed meta-xylene from the para-xylene enriched solvent extract, and separating the dissolved enriched para-xylene from the selective solvent.

The extraction should be carried out under such conditions that sulfonation of the xylenes charged is substantially repressed or prevented. The sulfuric acid-aromatic sulfonic acid solvent preferably contains sufficient water to prevent or minimize the reactivity between sulfuric acid and xylenes, and the extraction temperature is adjusted in accordance with the solvent sulfuric acid strength to prevent substantial sulfonation of the xylene charge.

The aromatic sulfonic acid component of the selective solvent may comprise the sulfonic acids of either or both mono- and poly-aromatic nuclear hydrocarbons, as for example, the sulfonic acids of benzene, toluene, ortho-, meta-, and para-xylenes, ethylbenzene, cumene, cymene, propylbenzene, butylbenzene, naphthalene or the methyl derivatives of naphthalene, anthracene or the methyl derivatives of anthracene, etc. The use of aromatic hydrocarbons which undergo polymerization at the extraction conditions should be avoided for reasons which will be apparent to those skilled in the art. It is convenient in the present process to use sulfonic acid derivatives of $C_8$ aromatic hydrocarbons as the aromatic sulfonic acid component of the selective solvent, which sulfonic acids may be obtained by sulfonating a portion of the xylene mixture to be charged to the process. The mono-sulfonic acids are preferably used; however, the di-sulfonic acids of polynuclear aromatic hydrocarbons may be used to promote the solubility of these aromatic sulfonic acids in the aqueous sulfuric acid component of the selective solvent.

One particular embodiment of the present invention is shown diagrammatically in the attached drawing. The extractor 11 represents an extraction apparatus suitable for the intimate contacting of two counterflowing liquid phases, as for example, a tower packed with Berl saddles or Raschig rings, or a sieve or baffle plate column, or a series of batch extraction steps wherein the counterflowing liquids are alternately mixed and settled. Any apparatus suitable for the intimate contacting of the counterflowing liquid phases may be used. The mixture of meta- and para-xylenes to be separated is introduced by means of line 12 into the extraction zone, preferably at an intermediate point in the extraction zones. The sulfuric-sulfonic acid selective solvent of a composition suitable for the preferential extraction of para-xylene, as more fully discussed hereinafter, is introduced into extractor 11 by means of line 13, adjacent its upper end.

In the extraction zone the solvent selectively dissolves para-xylene, and the resulting extract phase is withdrawn from the lower end of the extraction zone by means of line 14. The raffinate phase comprising an enriched meta-xylene is withdrawn from the extraction zone near the upper end by means of line 15; ethylbenzene, which may be present in the charge, will also be concentrated in the raffinate. Para-xylene may be refluxed to the extraction zone through line 16 to enrich the extract stream. Suitable means for regulating the temperature at different points in the extraction zone may be provided. The ratio of solvent to xylene feed is adjusted in accordance with the extraction conditions and the particular extractor used to achieve the desired operation.

The solvent extract from extractor 11 is then separated to obtain a para-xylene product and to recover the selective solvent for re-use. This separation may be accomplished directly by distillation, although such a distillation should be carried out under vacuum in order to prevent hydrolysis of the solvent sulfonic acids. It is preferable, however, to separate the para-xylene product from the solvent extract by extraction with a saturate hydrocarbon. Any saturate hydrocarbon which is liquid at the extraction conditions may be used; however, use of a low boiling saturate hydrocarbon is preferred to facilitate further separation of the para-xylene product from the saturate hydrocarbon by distillation. Suitable saturate hydrocarbons are, for example, n-butane, isobutane, n-pentane, isopentane, cyclopentane, n-hexane and its isomers, etc.

As shown in the attached drawing the solvent extract from extractor 11 is introduced by means of line 14 into a second extraction zone, extractor 17. A saturate hydrocarbon solvent such as pentane is introduced into extractor 17 through line 18. In this second extraction zone the para-xylene extract from the first extraction is dissolved in the saturate hydrocarbon and the mixture is withdrawn by means of line 19. The selective sulfuric-sulfonic acid solvent mixture is withdrawn through line 20 and introduced into fractionator 21. The fractionating conditions in 21 are regulated such that hydrolysis of the sulfonic acid portion of the selective solvent is substantially prevented, that is, the temperature is maintained below about 125° C. Saturate hydrocarbon, which may remain dissolved or emulsified in the said selective solvent, is separated therefrom by distillation in fractionator 21. The hydrocarbon is removed from the fractionator by means of line 22, condensed in condenser 23, and recycled to the extractor 17 by means of line 24. The selective sulfuric-aromatic sulfonic acid solvent is withdrawn from fractionator 21 by means of line 13 and recycled to the first extraction zone.

Within certain composition ranges, the solvent extract from extractor 11 may be separated into two immiscible liquid phases—a concentrated aromatic sulfonic acid phase containing substantially all the extracted para-xylene, and a lower phase containing a concentrate of aqueous sulfuric acid. After removal from extractor 11 this solvent extract may be passed through line 31 to settler 32 wherein the extract separates into the above-described liquid phases. The lower phase is removed from the settler and is directly recycled to extractor 11 through lines 33 and 13. The sulfonic acid concentrate phase is passed from the settler to extractor 17 through line 34, and the para-xylene extract separated therefrom by extraction with a saturate hydrocarbon; the aromatic sulfonic acid concentrate is stripped and recycled to the first extractor in the manner hereinbefore described. Generally solvent mixtures which contain by weight about 38 to 72% $H_2SO_4$, 13 to 30% $H_2O$, and xylene sulfonic acid in excess of about 7%, after contact with an amount of xylenes in excess of the amount soluble in the solvent mixture, will undergo the aforedescribed phase separation. Complete details concerning this phase separation are given in the copending application of Stuart and Reif, Serial No. 401,488, filed of even date herewith. Separating the selective solvent phases is advantageous in that less material is passed to the subsequent separation steps. However, if the conditions are such that two solvent phases are obtained, they need not be separated but may be passed directly from extractor 11 through line 14 to extractor 17. In this procedure, after the para-xylene extract has been removed the solvent phases are again miscible; the solvent is stripped and recycled to the first extractor as hereinbefore described.

Although the conditions in extractor 11 are such that sulfonation of the charge xylenes is substantially prevented, some minor amount of sulfonation may occur. To prevent a build-up of sulfonated xylenes in excess of the amount of sulfuric acid in the selective solvent over prolonged operation, a minor amount of solvent may be removed as desired by means of line 25. The removed solvent may be subjected to treatment (e. g. steam distillation) to hydrolyze a sufficient portion of the sulfonated xylenes to maintain solvent selectivity and the hydrolysis product containing an increased concentration of sulfuric acid may be returned to the system. Make-up solvent may be introduced as needed into the system by means of line 26.

An alternate procedure for removing sulfonated xylenes from the selective solvent comprises hydrolyzing and distilling these xylenes in fractionator 21. This procedure requires selection of a saturate hydrocarbon solvent corresponding in boiling range to the hydrolysis temperature of the sulfonated xylenes and/or regulation of the pressure in the fractionator, to effect the desired hydrolysis and distillation. The separated xylenes are passed to extractor 17 together with the saturate hydrocarbon wherein they are combined with the para-xylene extract. By substantially repressing sulfonation in extractor 11, the amount of said separated xylenes will be minor and will not substantially effect the purity of the para-xylene extract product.

The para-xylene extract from extractor 17 is distilled in fractionator 27 and the para-xylene product is withdrawn by means of line 28. The saturate solvent is withdrawn from the fractionator by means of line 29, condensed in condenser 30, and then may be directly recycled through line 18 to extractor 17. A portion of the para-xylene product may be recycled through line 16 to extractor 11.

The aromatic sulfonic acid component of the selective solvent promotes the solubility of the xylenes in the solvent, and should be present in amount sufficient to insure appreciable xylene solubility in the solvent. A preferred concentration range for the aromatic sulfonic acid component is about 10% to 45% by weight of the selective solvent, and the component preferably comprises the mono-sulfonic acid derivatives obtained by sulfonating a portion of the xylene charge. Said component may also comprise sulfonic acid polynuclear aromatic hydrocarbons which further increase xylene solubility in the solvent.

The aqueous sulfuric acid component of the solvent contains sufficient $H_2SO_4$ to insure selective absorption of paraxylene over meta-xylene, that is more $H_2SO_4$ by weight than aromatic sulfonic acid in the total solvent composition. The $H_2SO_4$ is diluted with water to repress the reactivity of the $H_2SO_4$ and xylenes. A preferred range of concentration of the $H_2SO_4$ in the aqueous sulfuric acid component is 40% to 85% by weight.

The temperature of the selective extraction zone (extractor 11 in the attached drawing) is maintained sufficiently low that substantial sulfonation of the charge does not occur, but the temperature should be above that at which crystallization of the aromatic sulfonic acid will occur. Xylenes are more soluble in the selective solvent at higher temperatures and for this reason it is preferred to maintain the extraction temperature as high as possible subject to the sulfonation limitation above-described. A suitable temperature range is about 25° C. to 80° C., with lower temperatures maintained at higher concentrations of $H_2SO_4$.

The ratio of solvent to feed may vary according to the separation desired, the solubility of xylenes in the selective solvent, and particular extractor used. Suitable solvent to feed ratios by weight are about 10 to 30 parts of solvent to 1 part of xylene feed using sulfonic acid derivatives of $C_8$ aromatic hydrocarbons as the aromatic sulfonic acid component of the selective solvent.

The following examples are specific illustrations of the invention:

*Example I*

A xylene mixture was batch extracted with a selective sulfuric-aromatic sulfonic acid solvent at room temperature. The solvent contained by weight 56% $H_2SO_4$, 14% $H_2O$, and 30% aromatic sulfonic acids. The aromatic sulfonic acids had been prepared by the complete mono-sulfonation of the aromatics in a mixture consisting of by volume 24% para-xylene, 60% meta-xylene, 4% ortho-xylene, 10% ethylbenzene, and 2% saturate hydrocarbon. The ratio of solvent to charge by weight was 5.25 to 1. The extraction mixture on settling separated into an upper raffinate phase, a concentrated aromatic sulfonic acid phase containing substantially all the dissolved xylenes, and a lower phase comprising a concentrate of aqueous sulfuric acid. The xylenes dissolved in the aromatic sulfonic acid phase were extracted therefrom with n-pentane, and then separated from the n-pentane by distillation. The following table shows the composition of the extracted xylenes as well as the composition of the charge xylenes.

|  | Volume Percent | | | | | Weight, Grams |
|---|---|---|---|---|---|---|
|  | Meta | Para | Ortho | Ethylbenzene | Saturate Hydrocarbons |  |
| Charge Xylenes | 60 | 24 | 4 | 10 | 2 | 171.6 |
| Extracted Xylenes | 47 | 41 | 6 | 6 |  | 10.4 |

Para-xylene was concentrated from 24% to 41% by extraction with the selective solvent.

Example II

In this example both the selective solvent and the xylene charge were prepared by the partial sulfonation of a mixture of xylenes. A xylene mixture comprising by volume 24% para-xylene, 60% meta-xylene, 4% ortho-xylene, 10% ethylbenzene, and 2% saturate hydrocarbon was contacted with 94% sulfuric acid at temperatures in the range of 20° C. to 55° C. The resulting mixture was cooled and settled. This treatment effected sulfonation of about 67% of the charge xylenes. The reaction product constituted a selective solvent with a composition by weight of 49% $H_2SO_4$, 8% $H_2O$, and 43% mono-sulfonic acid alkyl benzene derivatives containing eight carbon atoms. The sulfonic acids consisted of by volume about 11% para-xylene sulfonic acid, 76% meta-xylene sulfonic acid, 2% ortho-xylene sulfonic acid, and 11% ethylbenzene sulfonic acid. The unsulfonated portion of the xylene charge, having a composition as shown below, was used as the xylene charge to the extraction. The ratio of solvent to charge was 7.14 to 1, and the extraction was conducted at room temperature. The extraction mixture on settling separated into a raffinate phase and a single solvent extract phase. The xylenes dissolved in the solvent phase were extracted therefrom with n-pentane, and then separated from the n-pentane by distillation. The following table shows the compositions of the charge and the extracted xylene product.

|  | Volume Percent | | | | | Weight, Grams |
|---|---|---|---|---|---|---|
|  | Meta | Para | Ortho | Ethylbenzene | Saturate Hydrocarbons |  |
| Charge Xylenes | 32 | 46 | 8 | 8 | 6 | 157 |
| Extracted Xylenes [1] | 4 | 82 | 6 | 6 |  | 13.5 |

[1] Also contained 2% toluene.

Para-xylene was concentrated from 46% to 82% by extraction with the selective solvent.

Example III

A mixture of xylenes was batch extracted with a selective sulfuric-aromatic sulfonic acid solvent at room temperature. The solvent contained by weight 52% $H_2SO_4$, 23% $H_2O$, and 25% aromatic sulfonic acid. The sulfonic acid had been prepared by the complete mono-sulfonation of the aromatics in a mixture comprising by volume 22% para-xylene, 60% meta-xylene, 4% ortho-xylene, 12% ethylbenzene, and 2% saturate hydrocarbon. The ratio of solvent to charge by weight was 5.86 to 1. The extraction mixture on settling separated into an upper raffinate phase, a concentrated aromatic sulfonic acid phase containing substantially all the dissolved xylenes, and a lower phase comprising a concentrate of aqueous sulfuric acid. The xylenes dissolved in the intermediate phase were extracted therefrom with n-pentane, and then separated from the n-pentane by distillation. The following table shows the composition of the extracted xylenes as well as that of the charge xylenes.

|  | Volume Percent | | | | | Weight, Grams |
|---|---|---|---|---|---|---|
|  | Meta | Para | Ortho | Ethylbenzene | Saturate Hydrocarbons |  |
| Charge Xylenes | 5 | 80 | 7.5 | 7.5 |  | 343.2 |
| Extracted Xylenes | 3 | 86 | 9 | 2 |  | 30.0 |

Para-xylene was concentrated from 80% to 86% by extraction with the selective solvent.

Example IV

This example illustrates the importance of maintaining the sulfuric acid content of the solvent higher than the sulfonic acid content. In this example a non-selective solvent was used, which solvent comprised by weight more aromatic sulfonic acids than $H_2SO_4$.

A mixture of xylenes was intimately contacted in a batch extraction at room temperature with solvent containing by weight 33% $H_2SO_4$, 18% $H_2O$, and 49% aromatic sulfonic acid. The sulfonic acid had been prepared by the complete mono-sulfonation of the aromatics in a mixture comprising by volume 22% para-xylene, 60% meta-xylene, 4% ortho-xylene, 12% ethylbenzene and 2% saturate hydrocarbon. The ratio of solvent to charge by weight was 2.82 to 1. The extraction mixture on settling separated into a raffinate phase and a single solvent extract phase. The xylenes dissolved in the solvent phase were extracted therefrom with n-pentane and then separated from the n-pentane by distillation. The following table shows the composition of the extracted xylenes as well as that of the charge xylenes.

|  | Volume Percent | | | | | Weight, Grams |
|---|---|---|---|---|---|---|
|  | Meta | Para | Ortho | Ethylbenzene | Saturate Hydrocarbons |  |
| Charge Xylenes | 54 | 23 | 6 | 10 | 7 | 313.5 |
| Extracted Xylenes | 61 | 26 | 7 | 6 |  | 24.6 |

These results show a slight concentration of the para-xylene along with a similar concentration of the meta-xylene, thus indicating essentially no solvent selectivity between these compounds.

I claim:

1. A process for separating meta- and para-xylene from a mixture thereof which comprises selectively extracting para-xylene from said xylene mixture with a solvent composed of aqueous sulfuric acid and aromatic sulfonic acid and containing by weight more $H_2SO_4$ than aromatic sulfonic acid, under extraction conditions avoiding substantial sulfonation of the xylenes, and separating the meta-xylene enriched raffinate phase from a para-xylene enriched extract phase.

2. The process defined in claim 1 wherein the aromatic sulfonic acid component comprises sulfonic acid derivatives of $C_8$ aromatic hydrocarbons.

3. A process for separating meta- and para-xylene from a mixture thereof which comprises selectively extracting para-xylene from said xylene mixture with a solvent composed of aqueous sulfuric acid and aromatic sulfonic acid and containing by weight more $H_2SO_4$ than aromatic sulfonic acid, under extraction conditions avoiding sulfonation of the xylene, separating the meta-xylene enriched raffinate phase from a para-xylene enriched extract phase, and separating from said extract phase a para-xylene enriched extract product.

4. The process defined in claim 3 wherein the aromatic sulfonic acid component comprises sulfonic acid derivatives of $C_8$ aromatic hydrocarbons.

5. A process for separating meta- and para-xylene from a mixture thereof which comprises selectively extracting para-xylene from said xylene mixture with a solvent composed of aqueous sulfuric acid and aromatic sulfonic acid and containing by weight more $H_2SO_4$ than aromatic sulfonic acid, under extraction conditions such that substantially none of the xylenes is sulfonated, separating the meta-xylene enriched raffinate phase from a para-xylene enriched extract phase, extracting said extract phase with a saturate hydrocarbon solvent, and separating a para-xylene enriched extract product from said saturate hydrocarbon solvent by distillation.

6. A process for separating meta- and para-xylene from a mixture thereof which comprises selectively extracting para-xylene from 1 part by weight of said xylene mixture with 10 to 30 parts by weight of a solvent composed of by weight 10% to 45% aromatic sulfonic acid comprising mono-sulfonic acid derivatives of $C_8$ aromatic hydrocarbons and 55% to 90% aqueous sulfuric acid comprising 40% to 85% $H_2SO_4$ in the aqueous sulfuric acid, said solvent containing by weight more $H_2SO_4$ than aromatic sulfonic acid, at temperatures in the range of 25° C. to 80° C. such that substantially none of the xylenes is sulfonated, separating the meta-xylene enriched raffinate phase from a para-xylene enriched extract phase, extracting said extract phase with a saturate hydrocarbon solvent, and separating a para-xylene enriched extract product from said saturate hydrocarbon solvent by distillation.

References Cited in the file of this patent

UNITED STATES PATENTS

| | | |
|---|---|---|
| 2,403,972 | Friedman | July 16, 1946 |
| 2,562,068 | Souders | July 24, 1951 |